Figure 1:
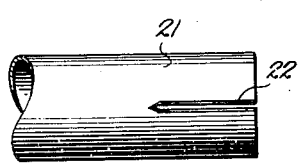

Nov. 8, 1949  J. N. NEWELL  2,487,169
PIPE TRUSS
Filed March 28, 1946  4 Sheets-Sheet 1

Inventor
John N. Newell
By Thos. E. Scofield
Attorney

Nov. 8, 1949 J. N. NEWELL 2,487,169
PIPE TRUSS
Filed March 28, 1946 4 Sheets-Sheet 2

Inventor
John N. Newell
By Thos. E. Scofield
Attorney

Nov. 8, 1949 J. N. NEWELL 2,487,169
PIPE TRUSS
Filed March 28, 1946 4 Sheets-Sheet 3
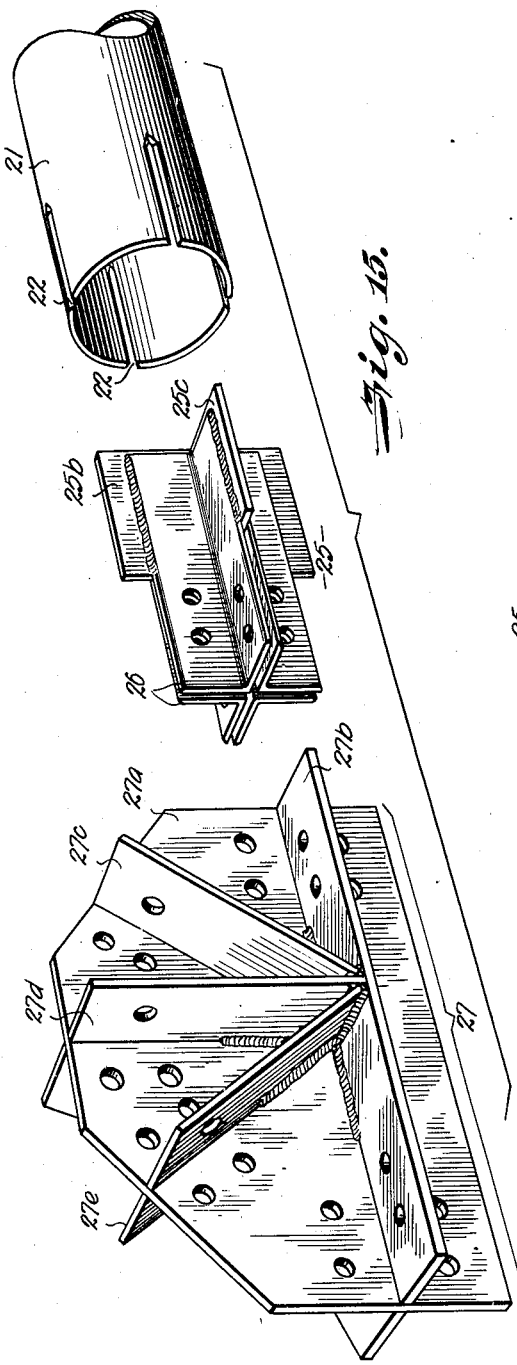
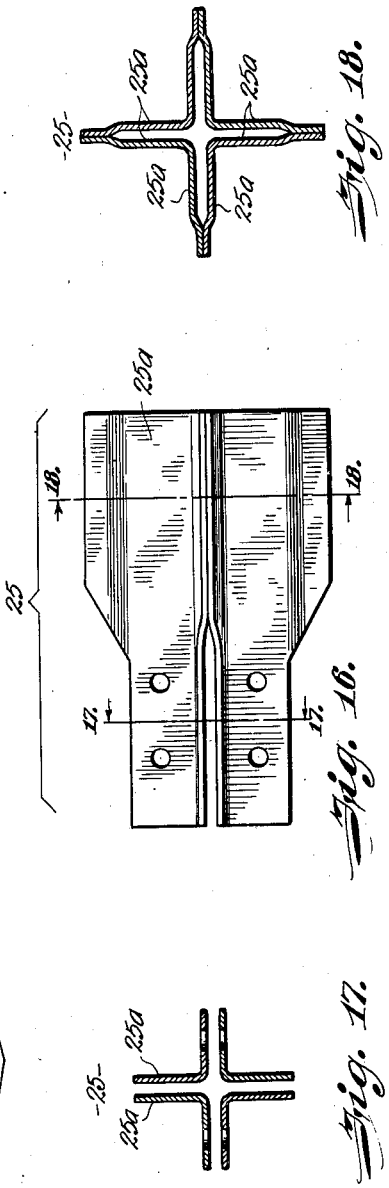
Inventor
John N. Newell
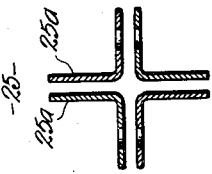
Attorney Nov. 8, 1949   J. N. NEWELL   2,487,169
PIPE TRUSS
Filed March 28, 1946   4 Sheets-Sheet 4

Inventor
John N. Newell
By Thos. E. Scofield
Attorney

Patented Nov. 8, 1949

2,487,169

UNITED STATES PATENT OFFICE 2,487,169

PIPE TRUSS

John N. Newell, Kansas City, Mo.

Application March 28, 1946, Serial No. 657,795

10 Claims. (Cl. 287—54)

This invention relates to improvements in pipe trusses and refers more particularly to the manner of connecting or joining pipes or circular sections when used as the supporting elements of the trusses.

The concept, therefore, has to do with the employment of pipe or circular sections in the construction and fabrication of a truss to function as a support for carrying a load across a span, as in the case of highway or railway bridges, derrick booms or as a column or tower to support a load. In other words, it is intended to replace the commonly used structural section with a suitable pipe section in any type of truss fabrication where such replacement or substitution is economically sound.

Present engineering practice has generally failed to avail itself and make use of circular or pipe sections particularly in steel structures and primarily in fabricated steel trusses even though a circular section is known to have advantages not present in the conventional structural element. A circular section is known to be the nearest perfect section in its ability to transmit loads that are applied in compression concentric with its long axis. Pound for pound the circular section outperforms all other known structural sections in transmitting compression or column loads. These advantageous characteristics result from the fact that all of the metal in a circular section is distributed uniformly throughout the extreme fiber of the section. Since the metal mass is arranged symmetrically about the point center of its circle or axis a circular or pipe member is equally stiff in all directions. These characteristics giving superior performance as a compression member would render a pipe or circular section preferable over structural sections now in use, if such sections could be easily and effectively incorporated into a truss. The difficulty of joining pipe ends to effectively and efficiently transmit the load has heretofore been the problem. The primary factor, therefore, responsible for retarding the use and employment of circular or pipe members as structural elements in a truss is the inability to produce an end connection to the pipe which will satisfactorily develop the strength of the pipe, that is, a connection that will transmit the full strength of the pipe to a joint in either tension, compression or shear.

Hereinafter there is disclosed a connection or joint which it is believed fulfills these requirements permitting the connecting of pipe ends to each other or into structural units or assemblies with an ease equal to or greater than the connecting of conventional members employing rolled shapes and built up plates at the joints. A factor in the instant development is the rapid advancement of the welding art and the facility with which welds may be made and the strengths obtained at a welded joint. To recapitulate, if a satisfactory joint can be provided, pipe members afford superior compression members and would permit the use of less material reducing the total weight of the completed structure.

If a satisfactory joint for a pipe or circular section were available it would make it possible to connect a pipe member for use as a tension member and utilize the entire cross sectional area of the member. In tension members of conventional design the entire cross sectional area is not effective since the area of the rivet holes robs the section of a considerable part of its strength. Hence in the case of tension members a considerable saving in weight and material can be gained by the use of a pipe section.

Furthermore, a truss constructed of pipe members offers substantially less resistance to wind pressure due to the airfoil properties of a cylindrical surface as compared to those of a rectangular section or members with protruding flanges. In spans of considerable length the advantage of lesser wind resistance becomes a significant factor in "designing up" members to withstand wind stresses.

A truss constructed of pipe members having their ends hermetically sealed would have much less area exposed to weathering and corrosive conditions of the atmosphere, consequently, the maintenance of the truss, principally the necessity for periodic painting, would require coverage of approximately one-half of the area presented by the conventional truss whose built-up members must be covered internally as well as externally. Also the areas to be painted on a pipe member present easy surfaces to work without intricate systems of lace bars and rivet heads to be covered which involves time and expense.

The use of circular sections would eliminate practically all shop rivets now required. Likewise a large amount of the shop cost of detailing, laying out, cutting and assembling of built-up members would be avoided. A large assortment and wide range of pipe and tube sizers are offered by manufacturers and if necessary by using pipes in multiples, that is, by arranging concentrically one or more smaller diameter pipes within a larger pipe it is possible to obtain a wide range of cross sectional areas.

Finally, the simplicity of design and facility with which a pipe truss can be fabricated, especially one where the members are of such size as to require separate assembly of the parts, would make for economy in cost of materials and fabrication. The simplicity of detailing a pipe member and fabricating it into the structure far outweighs the disadvantages inherent to the conventional design wherein parts must be cut, assembled and detailed drawings prepared for all built-up parts.

Further and other objects and advantages will appear from the description which follows.

Figure 2:
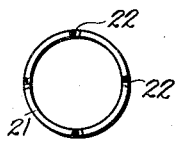
Figure 3:
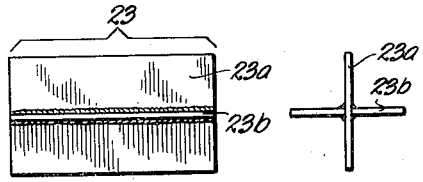
Figure 4:
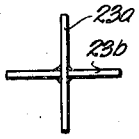
Figure 5:
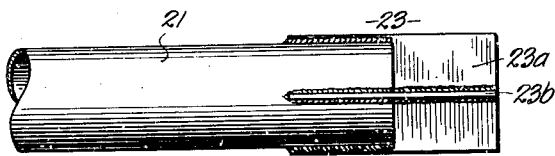
Figure 6:
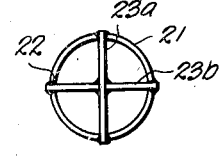
Figure 7:
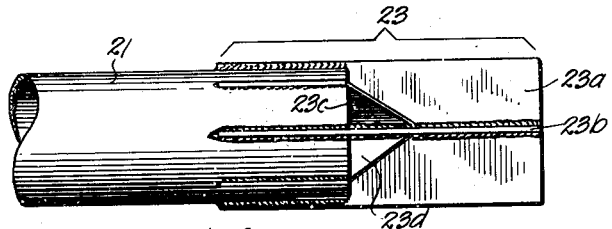
Figure 8:
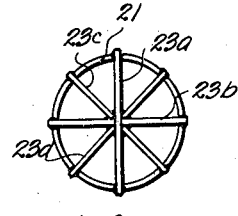
Figure 9:
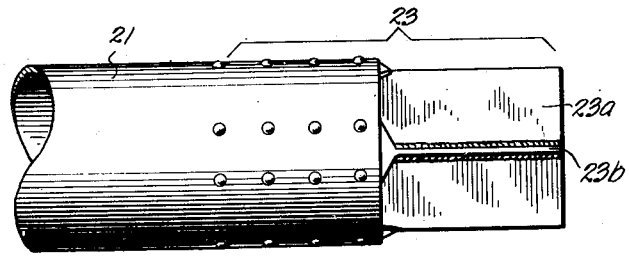
Figure 10:
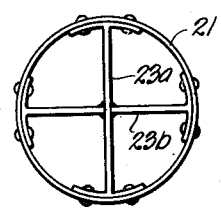
Figure 11:
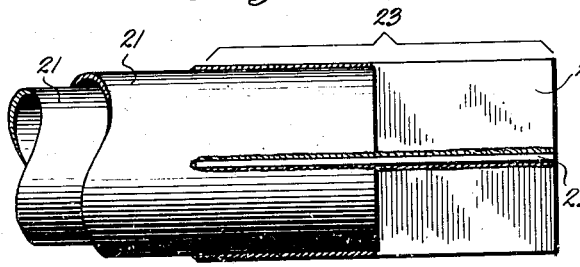
Figure 12:
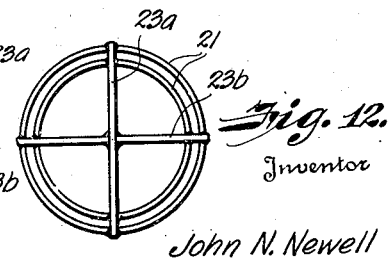
Figure 13:
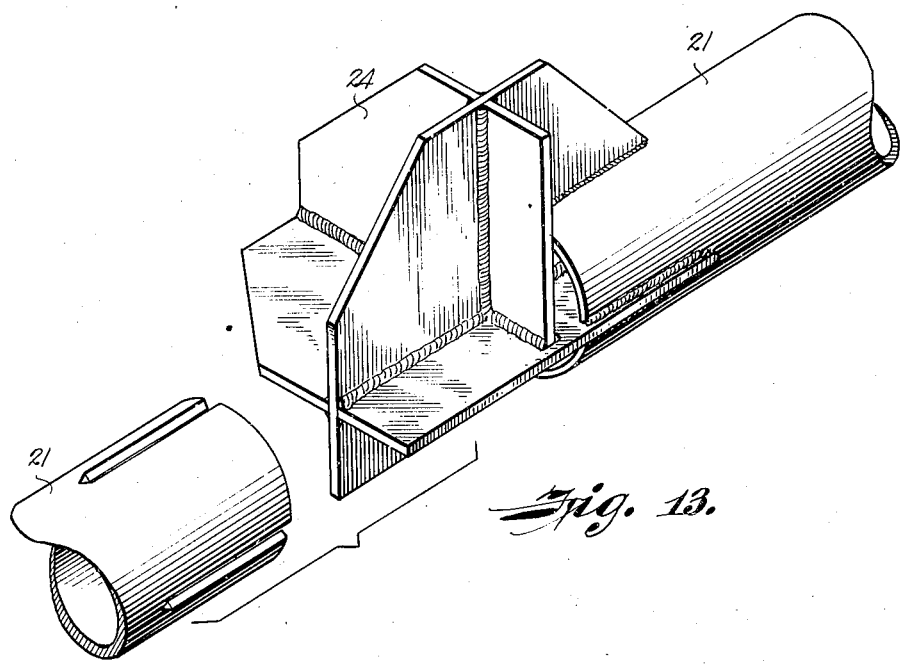
Figure 14:
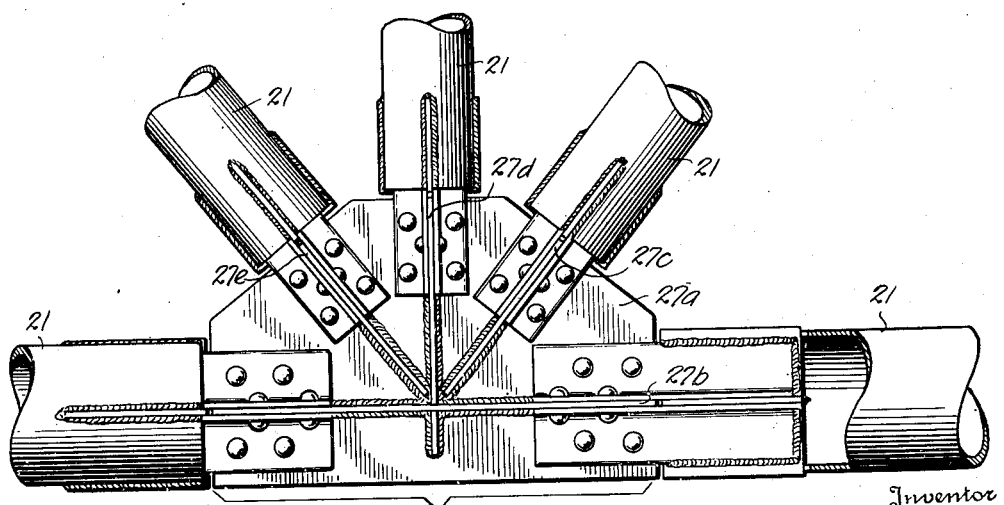
Figure 20:
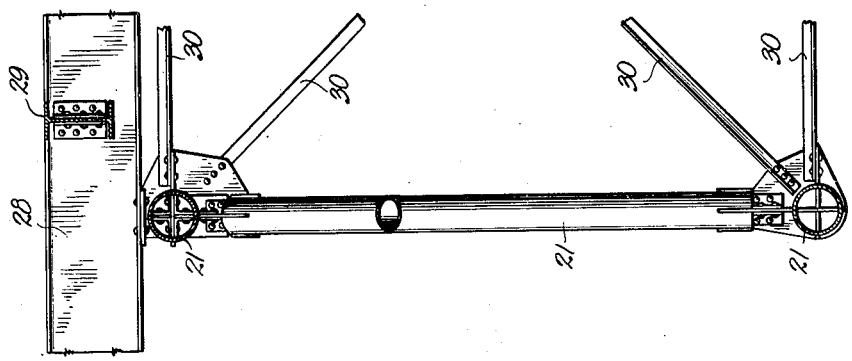
Figure 19:
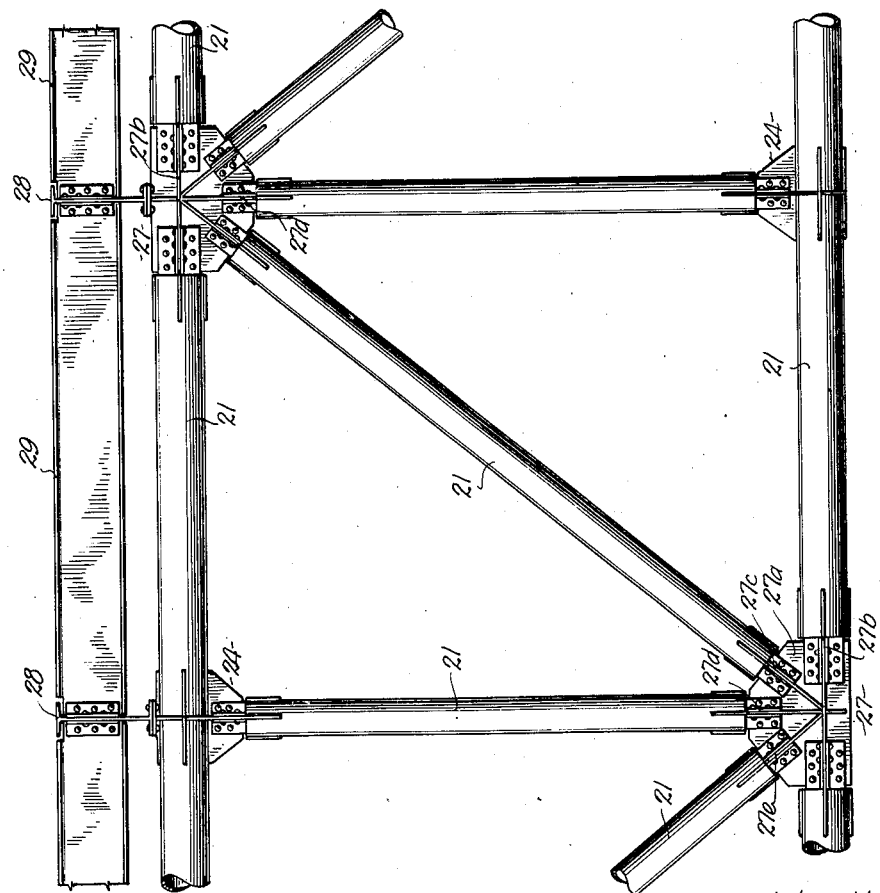

In the accompanying drawings which form a part of the instant specification and are to be read in conjunction therewith and in which like reference numerals are used to indicate like parts in the various views, Fig. 1 is a side view of a pipe end prepared for a connector by which the joint is made, Fig. 2 is an end view of the pipe shown in Fig. 1, Fig. 3 is a side view of a connector with plates intersecting at 90° angles, Fig. 4 is an end view of the connector shown in Fig. 3, Fig. 5 is a side view of a pipe end and connector assembly with the connector welded into the pipe, Fig. 6 is an end view of the assembly shown in Fig. 5, Fig. 7 is a modified type of connector utilizing 45° apart plates within the pipe, Fig. 8 is an end view of the assembly shown in Fig. 7, Fig. 9 is a side view of a pipe and end connector assembly with the connector riveted into the pipe, Fig. 10 is an end view of the assembly shown in Fig. 9, Fig. 11 is a side view of a welded pipe and end connector assembly wherein concentric pipes are used, Fig. 12 is an end view of the assembly shown in Fig. 11, Fig. 13 is a perspective view of a multiple connector for joining the ends of a plurality of pipes with two opposite pipe members shown assembled and disassembled respectively, Fig. 14 is a side view of a panel point showing a gusset plate system utilizing a modified type of connector, Fig. 15 is a disassembled view of a gusset plate system, connector and pipe end shown assembled in Fig. 14, Fig. 16 is a side view of a further modification of the connector, Fig. 17 is a view taken along the line 17—17 in Fig. 16 in the direction of the arrows, Fig. 18 is a view taken along the line 18—18 in Fig. 16 in the direction of the arrows, Fig. 19 is a side elevational view of a portion of a truss, and Fig. 20 is an end elevational view of the truss shown in Fig. 19.

Referring to the drawings and particularly to Figs. 1 to 6 inclusive, at 21 is shown a short length of a pipe end which has been slotted at 22 for a short distance back from the end of the pipe. The slots are located diametrically opposite each other and are tapered slightly from the outer to the inner wall of the pipe, best indicated in Fig. 2. In larger sized pipe it is contemplated that the walls of the slots may be tapered from both the inner and outer surfaces of the pipe to facilitate welding. A connector 23 consisting of intersecting plates 23a and 23b welded together at their intersection provides the joining element or member for uniting the pipe ends into the truss. The widths of the intersecting plates are slightly greater than the outside diameter of the pipe and the width of the slots is sufficient to accommodate the plates of the connector when the connector is slid into the end of the pipe, as indicated in Fig. 5. When the connector is in place in the end of the pipe the outer extremities of the plates are welded to the walls of the pipe, as indicated in Fig. 6. Note that a bead of metal is laid on both sides of the connector plates between the plate and the tapered wall of the slot. By thus welding the connector plate into the end of the pipe stress is evenly distributed throughout the wall of the pipe at its end.

In the modification shown in Figs. 7 and 8 the connector 23 comprises plates 23a and 23b supplemented in this type of connector by additional plates 23c and 23d. In this modification the end of the pipe is slotted at 45° about its periphery instead of 90° to accommodate the additional plates of the connector. This type of connector is particularly adapted to larger size pipes where better distribution of the stresses are transmitted to the wall of the pipe.

In the modification shown in Figs. 9 and 10 the extremities of the plates of the connector fitted within the pipe are flanged and drilled to receive rivets which fasten the flanges of the connector to the wall of the pipe. Obviously, the pipe end is drilled to match the rivet holes in the flanges of the connector so the rivets can be easily set. The connector arrangement provided in the modification shown in Figs. 11 and 12 is similar to that shown in Figs. 1 to 6 inclusive except in this modification concentric pipes are used as the circular sections instead of a single pipe. In this modification both pipe ends are slotted 90° apart and the connector inserted and welded to the walls of both pipes. In affixing the connector to the concentric pipes the inner pipe or tube would first be welded and the outer pipe slipped onto the connector and thereafter welded.

Fig. 13 indicates how pipes, slotted as shown in the preceding figures, may be connected at a panel point by use of a multiple connector 24 common to the ends of several pipe members. The connection of the pipe section 21 to the multiple connector 24 is, in this instance, by welding to the plates of the connector. Figs. 16, 17 and 18 are different views of a modified type of connector 25 formed from angle members 25a welded together at their outer extremities in the form of a cross, as shown in Fig. 18. A similar modification to the connector shown in these figures is that used to join the pipe end to the gusset plate system at the panel point in the exploded view in Fig. 15. In this latter view the connector comprises intersecting plates 25b and 25c which are welded into the tapered slots 22 of pipe section 21. This type of connector, however, has welded to the vertical and horizontal plates 25b and 25c angles 26 corresponding to the ends of the angle members shown in the subsequent Figures 16, 17 and 18. Angles 26 are spaced by the plates so they fit upon vertical plate 27a and horizontal plate 27b of the gusset plate system 27, shown in Figs. 14 and 15. Holes drilled through the angles register with holes in the plates of the gusset plate system in order that the angles can be rigidly riveted to the plates which they engage. The gusset plate system shown in Figs. 14 and 15 has additional plates 27c, 27d and 27e arranged at different angles to receive the connections which are joined into the panel point from different directions.

In connecting the pipe ends to a panel point two modifications have been indicated, the welded arrangement shown in Fig. 13 and the combined welded and riveted arrangement shown in Figs. 14 and 15. It is contemplated, however, that any of the connectors shown in the first twelve figures may be used to join the pipe end to the panel point.

In Figs. 19 and 20 a portion of a truss utilizing pipes as stress elements is shown. In these figures the joints at the panel points are similar to those indicated in Figs. 14 and 15. These figures also indicate how the connectors are used to join the pipe ends. On top of the truss supported on cross beams 28 are stringers 29 running longitudinally of the truss which carry the floor of the bridge. It will be appreciated that these supporting members may be built into the lower members of the truss as well as on top of the truss.

It will also be seen that horizontal and diagonal stress members 30, either circular in cross section or plain angle members, may be connected into the panel point to assure lateral rigidity to the truss.

In a truss of conventional design it is obligatory to employ two parallel systems of gusset plates at the truss panel points in order to connect the ends of the members that radiate from the panel point. It is common practice to connect truss members by riveting the ends of the members to parallel systems of gussets with the result that the rivets act in most cases in single shear. It is possible by the subject arrangement to fabricate a gusset plate system for the connection of the ends of the pipe members at a panel point so the plates in the system are integral or common to the end connector of the pipe member and form a laminated arrangement at the joint. In this laminated arrangement of gussets and connecting plates each rivet is common to the complete system of plates and acts in double shear. In many instances it is possible to duplicate the transmission of stresses through a panel point in a pipe truss with as few as one-half of the number of field rivets as would be employed in a conventional design of identical stresses.

In fabricating a truss using pipe members where their ends are connected by a common system of gusset plates, it is possible to greatly simplify shop operations of laying out the truss and maintaining its exact shape. In the case of large trusses it is proposed that a gusset plate system first be assembled complete with the end connectors for the pipe ends. The assembled gusset plate system and connectors would be constructed, subdrilled or punched according to plan and then reamed with component parts assembled. To insure that the connectors radiate from the panel point at their proper angles the entire assembly is placed in a jig or checked against a template. The assembly could then be dismantled and the end connectors fastened to their respective pipes. In most cases the end connectors would be fastened to the pipes by welding. Actually it is necessary only to cut the pipes to approximately the correct length for the truss being fabricated. The end connectors dismantled from the gusset plate system would then be placed in position in the ends of the pipes and adjusted longitudinally therein by slipping the connector into the pipe as far as necessary until the exact overall design length is obtained. This overall length can be checked from end hole to end hole of the two connectors on opposite ends of the pipe and the connectors then welded into the pipe. Due to the fact that the connectors have been reamed, assembled with the gusset plate system the completed pipe members must fit correctly in the truss. To insure an exact fit for all members in the truss of a conventional design it is necessary to shop assemble the truss either complete or in sections and ream all holes in connecting members while the truss is so assembled. This shop assembly and reaming of a large truss is an expensive and awkward operation which is dispensed with entirely in the fabrication of a pipe truss.

From the foregoing it will be seen that there is provided a simple and efficient joint for connecting circular or pipe sections into a truss element. The stresses to which the truss is subjected are evenly distributed into the walls of the pipes and advantage is taken of the increased strength of the tubular members which make up the truss. The joints are easily made both to the pipe end and to panel points, gusset plates or other members where the pipe ends are joined.

From the foregoing it will be seen that this invention is one well adapted to attain all of the ends and objects hereinabove set forth together with other advantages which are obvious and which are inherent to the invention.

It will be understood that certain features and sub-combinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

Having thus described my invention I claim:

1. In a joint for pipes or circular sections of a truss element, a pipe end, a connector plate assembly formed of intersecting plates fitted axially into the pipe end for a portion of its length, each plate extending across the pipe and having its diametrically opposite edges affixed to the pipe wall, the portion of the plate assembly extending from the pipe end adapted to be united to other members of the truss.

2. In a joint for pipes or circular sections of a truss element as in claim 1 wherein the peripheral edges of the plates of the connector assembly fit into slots in the pipe wall and are welded thereto.

3. In a joint for pipes or circular sections of a truss element, a pipe end, a connector plate assembly formed of intersecting plates fitted axially into the pipe end for a portion of its length, the peripheral edges of the plates of the connector assembly having flanges which fit the curvature of the pipe wall and are affixed thereto, the portion of the plate assembly extending from the pipe end adapted to be united to other members of the truss.

4. In a joint for pipes or circular sections of a truss element as in claim 1 wherein the planes of the plates which form the connector assembly extend diametrically of the pipe ends and the line of intersection of said plates coincides with the axis of the pipe ends.

5. In a joint for pipes or circular sections of a truss assembly, a plurality of pipes concentrically arranged, a connector plate assembly formed of intersecting plates fitted axially into the ends of the concentrically arranged pipes for a portion of its length, each plate extending completely across the outer pipe and being affixed to every pipe at diametrically opposite points on the pipe, the portion of the plate assembly extending from the pipe ends adapted to be united with other members of the truss.

6. In a joint for pipes or circular sections of a truss element as in claim 6 wherein all of the peripheral edges of the plates of the connector assembly fit into slots in the pipe walls and are welded thereto.

7. In a joint for a tubular truss element, crossed plates each extending diametrically across the tubular element with its opposite edges affixed to the walls of the tubular element, a portion of said plates extending beyond the end of the tubular element and adapted to be united with other members of the truss.

8. In a joint for a tubular truss element, at least three internal radial fins equally spaced around the inside of the tubular element at one end thereof, said fins intersecting at the axis of the tubular element and rigidly connected to one another at such intersection, and said fins projecting axially beyond the end of the tubular element whereby the projecting portion is connectable to other members of the truss.

9. In a joint for a tubular truss element, fins extending radially inward from the wall of the tubular element and connected to one another along a line coinciding with the axis of the tubular element, each fin having an extension beyond the end of the tubular element and comprising a pair of ears paralleling the fin and spaced apart from each other a distance substantially equal to the thickness of the fin.

10. In a joint for a tubular truss element, fins extending radially inward from the wall of the tubular element and connected at their outermost edges to the wall of the tubular element, each fin comprising a pair of plates disposed face to face and having oppositely offset portions beyond the end of the tubular element forming spaced-apart parallel ears.

JOHN N. NEWELL.

REFERENCES CITED

The following references are of record in the file of this patent:

UNITED STATES PATENTS

| Number | Name | Date |
|---|---|---|
| 1,828,235 | Van Hattum | Oct. 20, 1931 |
| 1,882,673 | Ronan | Oct. 18, 1932 |
| 2,299,143 | Hellwig | Oct. 20, 1942 |

FOREIGN PATENTS

| Number | Country | Date |
|---|---|---|
| 710,406 | France | June 8, 1931 |